(12) United States Patent
Jeon et al.

(10) Patent No.: US 6,298,074 B1
(45) Date of Patent: Oct. 2, 2001

(54) MODE-LOCKED FIBER LASER AND FIBER AMPLIFIER USING SINGLE PUMP LASER

(75) Inventors: Min Yong Jeon; Hak Kyu Lee; Seung Beom Kang; Kyong Hon Kim, all of Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 0 days.

(21) Appl. No.: 09/491,172

(22) Filed: Jan. 25, 2000

(30) Foreign Application Priority Data

Aug. 13, 1999 (KR) .................................................. 99-33396

(51) Int. Cl.[7] .............................. H01S 3/30; H01S 3/098; H01S 3/00; H04B 10/16
(52) U.S. Cl. ................................. 372/18; 372/6; 359/341; 359/179
(58) Field of Search .......................... 372/6, 18; 359/341, 359/345, 160, 173, 179

(56) References Cited

U.S. PATENT DOCUMENTS

| 5,453,836 | * | 9/1995 | Kim et al. ............................. 356/350 |
| 5,497,386 | * | 3/1996 | Fontana ................................. 372/18 |
| 5,577,057 | * | 11/1996 | Frisken ................................. 372/18 |
| 5,617,434 |   | 4/1997 | Tamura et al. ......................... 372/6 |
| 5,734,665 |   | 3/1998 | Jeon et al. ............................. 372/6 |
| 5,790,722 |   | 8/1998 | Minden et al. ....................... 385/27 |
| 5,898,716 | * | 4/1999 | Ahn et al. ............................. 372/6 |

OTHER PUBLICATIONS

Richardson et al., "320fs Soliton Generation With Passively Mode–Locked Erbium Fibre Laser," *IEEE Electronics Letters* 27(9):730–732, 1991.
Richardson et al., "Pulse Repetition Rates In Passive, Self-starting Femtosecond Soliton Fibre Laser," *IEEE Electronics Letters* 27(16):1451–1453, 1991.
Grudinin et al., "Energy Quantisation In Figure Eight Fibre Laser," *IEEE Electronics Letters* 28(1):67–68, 1992.

* cited by examiner

*Primary Examiner*—Frank G. Font
*Assistant Examiner*—Armando Rodriguez
(74) *Attorney, Agent, or Firm*—E. Russell Tarleton; Seed Ip Law Group PLLC

(57) ABSTRACT

A mode-locked fiber laser and a fiber amplifier using a single pump laser, the fiber laser using a pump source to generate soliton optical short pulse and the fiber amplifier amplifying the optical short pulse. The mode-locked fiber laser and fiber amplifier use a single pump laser in accordance with an embodiment of the present invention that includes a tunable directional coupler, a mode-locked fiber laser, and an optical amplifier. The tunable directional coupler is connected to the pump source. The mode-locked fiber laser receives the pump output of the pump source and generates a soliton optical pulse. The mode-locked fiber laser is connected to an output port of the tunable directional coupler. The optical amplifier receives the pump output of the pump source, receives the soliton optical pulse generated by the mode-locked fiber laser, and amplifies the soliton optical pulse. The optical amplifier is connected to the other output port of the tunable directional coupler.

7 Claims, 2 Drawing Sheets

MODE-LOCKED FIBER LASER AND FIBER AMPLIFIER USING SINGLE PUMP LASER

TECHNICAL FIELD

The present invention relates to a mode-locked fiber laser and fiber amplifier using a single pump laser. The fiber laser uses a pump source to generate a soliton optical short pulse and the fiber amplifier amplifies the optical short pulse.

BACKGROUND OF THE INVENTION

Presently, a soliton pulse generated by optical fiber laser is desirable in the area of high-speed optical communication since it has a short pulse width. A conventional passive mode-locked optical fiber laser requires an increased output of a pump source to generate a soliton pulse and the generated pulse is oscillated as a form of bunch. Therefore, in order to generate a soliton optical short pulse, the output of the pump source needs to be down to threshold current.

Previous studies have been conducted by D. I. Laming, D. N. Payne, V. J. Matsas, M. W. Philips in April and August, 1991.

The title of the technical paper published in April 1991 is "320 fs soliton generation with passively mode locked erbium fiber laser", IEEE Electronics Letters, Vol. 27, No. 9, pp. 730~732. The title of the technical paper published in August 1991 is "Pulse repetition rates in passive, selfstarting, femtosecond soliton fiber laser", IEEE Electronics Letters, Vol. 27, No. 16, pp. 1451~1453.

According to these previous studies, optical fiber lasers autonomously generate a pulse by increasing pump output and a multiple soliton optical pulse is generated within a period. When pump output is decreased slowly in the state, the number of multiple soliton optical pulses is decreased. When the pump current gets close to the threshold current, one soliton optical pulse is generated within a period.

However, when the pump current gets decreased close to the threshold current, the output of the soliton optical short pulse generated by the optical fiber laser may have a seriously low value and therefore efficiency of the pump output is lowered.

SUMMARY OF THE INVENTION

A mode-locked fiber laser and fiber amplifier using a single pump laser is provided.

The mode-locked fiber laser and fiber amplifier using the single pump laser in accordance with an embodiment of the present invention includes a tunable directional coupler, a mode-locked fiber laser, and an optical amplifier. The tunable directional coupler is connected to a pump source. The mode-locked fiber laser receives the pump output from the pump source and generates a soliton optical pulse. The mode-locked fiber laser is connected to an output port of the tunable directional coupler. The optical amplifier receives the pump output from the pump source, receives the soliton optical pulse generated by the mode-locked fiber laser, and amplifies the soliton optical pulse. The optical amplifier is connected to the other output port of the tunable directional coupler.

Preferably, the tunable directional coupler adjusts a division rate of the pump output and the pump output is provided to the mode-locked fiber laser and the optical amplifier.

Preferably, the tunable directional coupler connects all of the pump output of the pump source to the mode-locked fiber laser initially for generating a multiple soliton optical pulse at the mode-locked fiber laser and then increases a division rate for generating a single soliton optical pulse at the mode-locked fiber laser. The single soliton optical pulse is amplified by the optical amplifier.

Preferably, the mode-locked fiber laser is a ring-type fiber laser.

Preferably, the mode-locked fiber laser is figure-of-eight type fiber laser.

Preferably, the mode-locked fiber laser is a linear-type fiber laser.

Preferably, the mode-locked fiber laser is a rare-earth doped laser.

BRIEF DESCRIPTION OF THE DRAWINGS

The embodiments of the present invention will be explained with reference to the accompanying drawings, in which.

DETAILED DESCRIPTION OF THE INVENTION

Figure 1:
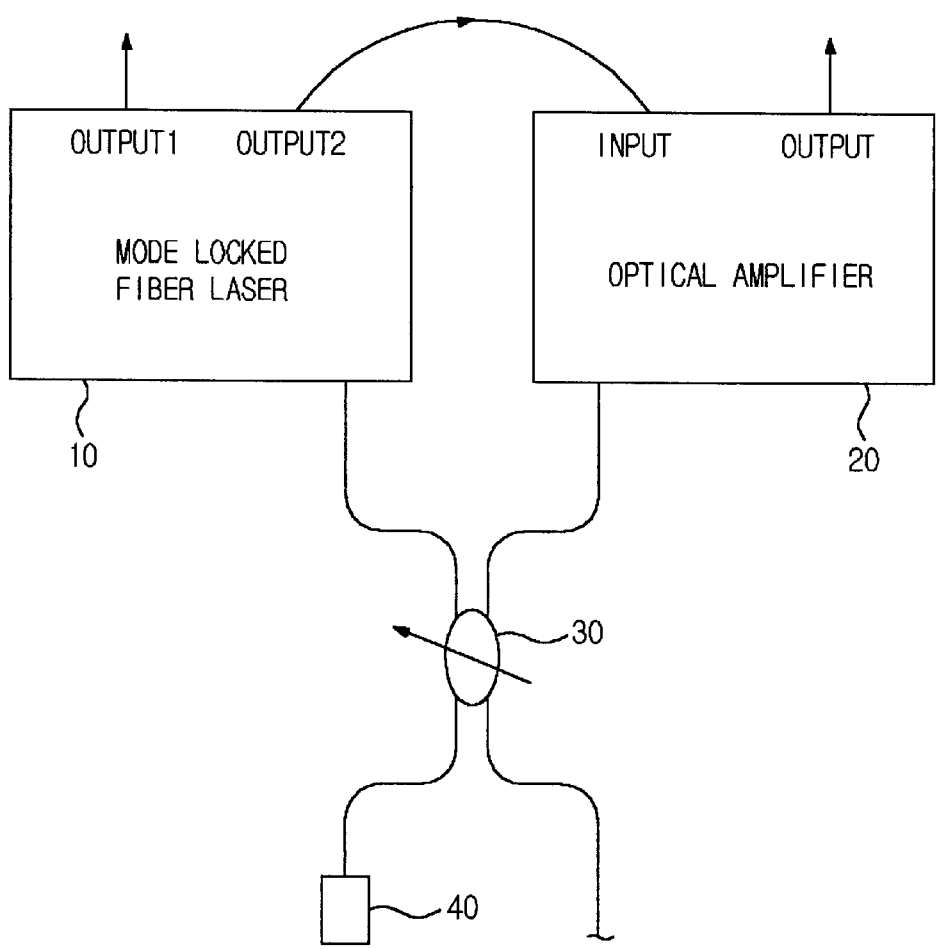
FIG. 1 is a diagram illustrating a structure of the mode-locked fiber laser and fiber amplifier using a single pump laser in accordance with an embodiment of the present invention.

FIG. 1 is a diagram illustrating a structure of a mode-locked fiber laser and fiber amplifier using a single pump laser in accordance with an embodiment of the present invention. The embodiment includes a mode-locked fiber laser 10, an optical amplifier 20, a tunable directional coupler 30, and a pump source 40.

The pump source 40 is connected with the tunable directional coupler 30, and two output ports of the tunable directional coupler 30 are connected with the mode-locked fiber laser 10 and the optical amplifier 20, respectively. The mode-locked fiber laser 10 generates a soliton optical pulse through the two output ports. The soliton pulse generated through the first output is used to monitor a soliton optical pulse and a soliton pulse generated through the second output is provided to the optical amplifier 20 and then amplified.

The optical amplifier uses a pump output supplied by the tunable directional coupler 30 to amplify the soliton optical pulse that is provided by the mode-locked fiber laser 10. The output part of the optical amplifier 20 monitors the amplified soliton optical pulse.

The mode-locked fiber laser and fiber amplifier use the single pump laser in accordance with an embodiment of the present invention operate as follows.

The pump output of the pump source 40 is connected to the tunable directional coupler 30 and the tunable directional coupler 30 connects the pump output to the mode-locked fiber laser 10. The mode-locked fiber laser 10 oscillates the mode-locking and therefore a bunch-type soliton optical pulse is obtained. At the moment, the tunable directional coupler 30 changes the division rate and the pump output that is supplied to the mode-locked fiber laser 10 is slowly diminished. Consequently, the bunch-type soliton optical pulse is decreased and only a single soliton optical pulse is oscillated.

Here, if the tunable directional coupler 30 adjusts the division rate, and the pump output that is supplied to the mode-locked fiber laser 10 is slowly diminished, and the pump output that is supplied to the optical amplifier 20 is relatively increased and the optical amplifier performs its main role.

That is, the pump output is supplied to the mode-locked fiber laser 10 and then a remaining part of the pump output is supplied to the optical amplifier 20 to operate the optical amplifier 20. A single soliton optical pulse generated by the mode-locked fiber laser 10 is provided to the input part of the optical amplifier 20 and therefore the output is improved.

When the mode-locked fiber laser 10 oscillates a single soliton optical pulse, the embodiment of the present invention provides the remaining part of the pump output to the optical amplifier 20 and therefore the single soliton pulse is amplified. The first output of the mode-locked fiber laser 10 generates 10% of the generated soliton optical pulse, and it is used for monitoring soliton optical pulse.

Figure 2:
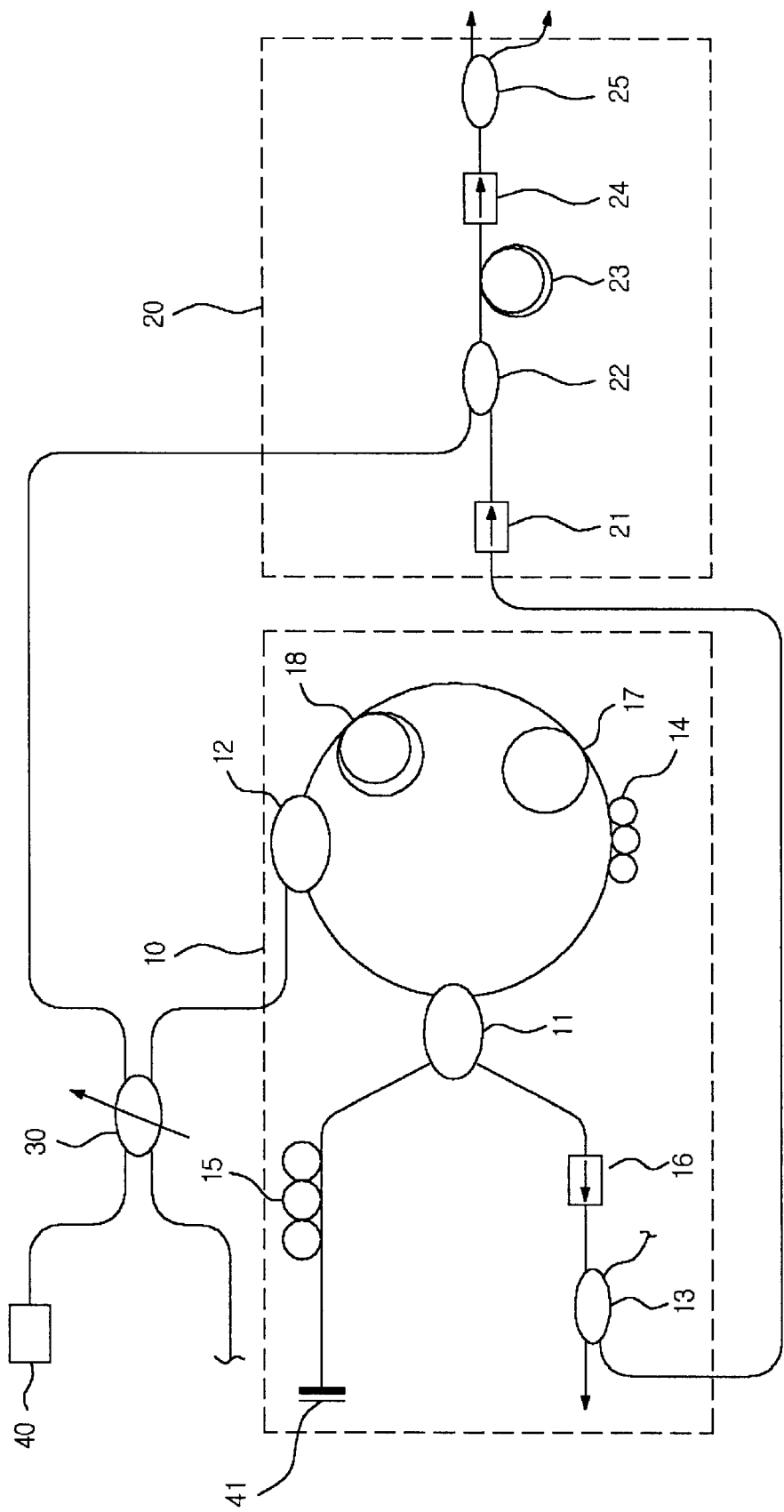
FIG. 2 is a diagram illustrating the structure shown in FIG. 1 in detail.

FIG. 2 is a diagram illustrating the structure shown in FIG. 1 in detail.

The mode-locked fiber laser 10 includes a linear mirror and loop mirror. The general optical amplifier may implement the optical amplifier 20. The mode-locked fiber laser 10 was disclosed at U.S. Pat. No. 5734655, "Optical Fiber Laser".

The mode-locked fiber laser 10 includes a Faraday rotating mirror 41 and a polarization controller 15. The loop mirror includes a dispersion shifted fiber 17 and a fiber directional coupler 12, a polarization controller 14, and an erbium-doped optical fiber 18. The dispersion shifted fiber 17 adjusts the dispersion value of the laser device. The linear mirror and the loop mirror are connected through the 3dB fiber tunable directional coupler 11 and the generated optical pulse is provided through the optical isolator 16. The optical fiber laser in accordance with an embodiment of the present invention uses the Faraday rotating mirror to rotate polarization between lights advancing two different directions by 90 degrees and a phase delay caused by polarization change is cancelled out. Therefore, a soliton optical pulse that is stable against environmental change is obtained.

The soliton optical pulse generated by the mode-locked fiber laser 10 is divided at the 10% tunable directional coupler 13, with 10% of the soliton optical pulse provided for monitoring and 90% of the soliton optical pulse supplied to the input part of the optical amplifier 20. The pump source 40 provides mode-output to the mode-locked fiber laser 10 and the optical amplifier 20 through the tunable directional coupler 30.

In order to oscillate the soliton optical pulse, the tunable directional coupler 30 provides mode-output to the mode-locked fiber laser 10. Later, the multiple soliton optical pulse is oscillated and the division rate is increased toward the optical amplifier by adjusting the tunable directional coupler 30. The mode-locked fiber laser 10 oscillates the single soliton optical pulse and the pump output of the optical amplifier is increased at the same time, and therefore the soliton optical pulse is amplified.

The mode-locked fiber laser and fiber amplifier using a single pump laser in accordance with an embodiment of the present invention improves an output of the optical pulse and uses the remaining pump output efficiently. That is, the mode-locked fiber laser and the fiber amplifier using the single pump laser in accordance with an embodiment of the present invention employs one pump source to generate the soliton optical pulse and operates the optical amplifier at the same time for amplifying the generated soliton pulse.

Although representative embodiments of the present invention have been disclosed for illustrative purpose, those who are skilled in the art will appreciate that various modifications, additions, and substitutions are possible without departing from the scope and spirit of the present invention as defined in the accompanying claims and equivalents thereof.

What we claim:

1. A mode-locked fiber laser and a fiber amplifier using a single pump laser, comprising:
   a tunable directional coupler connected to a pump source;
   a mode-locked fiber laser for receiving a pump output of the pump source and generating a soliton optical pulse, the mode-locked fiber laser being connected to an output port of the tunable directional coupler; and
   an optical amplifier for receiving the pump output of the pump source, receiving the soliton optical pulse generated by the mode-locked fiber laser, and amplifying the soliton optical pulse, the optical amplifier being connected to the other output port of the tunable directional coupler.

2. The mode-locked fiber laser and fiber amplifier using a single pump laser of claim 1, wherein the tunable directional coupler adjusts a division rate of the pump output, the pump output being provided to the mode-locked fiber laser and the optical amplifier.

3. The mode-locked fiber laser and fiber amplifier using a single pump laser of claim 2, wherein the tunable directional coupler connects all pump output of the pump source to the mode-locked fiber laser initially for generating a multiple soliton optical pulse at the mode-locked fiber laser and then increasing the division rate for generating a single soliton optical pulse at the mode-locked fiber laser, the single soliton optical pulse being amplified by the optical amplifier.

4. The mode-locked fiber laser and fiber amplifier using a single pump laser of claim 1, wherein the mode-locked fiber laser is a ring-type fiber laser.

5. The mode-locked fiber laser and fiber amplifier using a single pump laser of claim 1, wherein the mode-locked fiber laser is a figure-of-eight type fiber laser.

6. The mode-locked fiber laser and fiber amplifier using a single pump laser of claim 1, wherein the mode-locked fiber laser is a linear-type fiber laser.

7. The mode-locked fiber laser and fiber amplifier using a single pump laser of claim 1, wherein the mode-locked fiber laser is a rare-earth doped laser.

* * * * *